United States Patent
Skertich, Jr. et al.

(10) Patent No.: US 9,228,713 B2
(45) Date of Patent: Jan. 5, 2016

(54) LIGHT BEACON ASSEMBLY

(75) Inventors: Tim Skertich, Jr., Dyer, IN (US);
Duane P. Belitz, Frankfort, IL (US);
Robert R. March, Jr., Plainfield, IL (US)

(73) Assignee: Federal Signal Corporation, Oak Brock, IL (US)

( * ) Notice: Subject to any disclaimer, the term of this patent is extended or adjusted under 35 U.S.C. 154(b) by 69 days.

(21) Appl. No.: 13/601,213

(22) Filed: Aug. 31, 2012

(65) Prior Publication Data
US 2014/0062713 A1  Mar. 6, 2014

(51) Int. Cl.
| | |
|---|---|
| G08B 5/22 | (2006.01) |
| F21V 5/04 | (2006.01) |
| F21V 19/00 | (2006.01) |
| F21W 111/00 | (2006.01) |
| F21Y 101/02 | (2006.01) |
| F21Y 111/00 | (2006.01) |
| B60Q 1/26 | (2006.01) |

(52) U.S. Cl.
CPC ............... *F21V 5/04* (2013.01); *F21V 19/003* (2013.01); *B60Q 1/2611* (2013.01); *F21W 2111/00* (2013.01); *F21Y 2101/02* (2013.01); *F21Y 2111/001* (2013.01); *Y10T 29/49126* (2015.01)

(58) Field of Classification Search
CPC .......... F21Y 2101/02; F21Y 2113/005; B60Q 1/2611; B60Q 1/2696; F21W 2111/00; F21V 5/04; F21V 5/046; F21V 5/045; H05B 33/0803; B63B 45/04; F21K 9/00; G08B 5/38; G08B 5/36; G08B 7/066; G09F 9/33

USPC ............... 340/331, 332, 326, 691.1, 518.42, 340/815.45; 362/219, 221, 22, 223, 300, 362/800
See application file for complete search history.

(56) References Cited

U.S. PATENT DOCUMENTS

| | | | | |
|---|---|---|---|---|
| 2,738,492 | A * | 3/1956 | Arneson et al. | 340/472 |
| 3,124,708 | A * | 3/1964 | Reinecke, Jr. et al. | 326/133 |
| 3,325,930 | A * | 6/1967 | Braeutigam | 40/473 |
| 3,723,725 | A * | 3/1973 | Jaeger | 362/35 |
| 3,732,537 | A * | 5/1973 | Freeman | 340/472 |

(Continued)

OTHER PUBLICATIONS

2004 LED Series, LED Beacons, A Superior Signal in a Compact, Durable Beacon brochure—PSC Amber® from Code 3®, admitted prior art as of the earliest filing date of the present application, 1 page.

(Continued)

*Primary Examiner* — Paul Obiniyi
(74) *Attorney, Agent, or Firm* — Merchant & Gould P.C.

(57) ABSTRACT

The present application relates to a light beacon, light beacon assembly, and methods of its construction. In one aspect, a light beacon assembly includes a housing including a base and a lens cooperating to enclose an interior volume, the lens having a generally cylindrical shape. The assembly also includes a plurality of circuit boards positioned within the interior volume, where each of the plurality of circuit boards having a conductive tab extending from a first side, a conductive tab receiver near a second side, and a light emitting diode mounted thereon. The plurality of circuit boards are each positioned within the interior volume and extend perpendicularly from the base such that the tab of each circuit board is received at the tab receiver of an adjacent circuit board. The plurality of circuit boards are interconnected to form a structure having light emitting diodes oriented outwardly toward the lens.

18 Claims, 7 Drawing Sheets

(56) References Cited

U.S. PATENT DOCUMENTS

| | | | | |
|---|---|---|---|---|
| 3,739,169 | A | * | 6/1973 | Weinreich .................... 362/542 |
| 3,763,367 | A | * | 10/1973 | Nitsch et al. .................. 362/548 |
| 3,784,809 | A | * | 1/1974 | Smith ............................ 362/35 |
| 3,875,561 | A | * | 4/1975 | Scarpino et al. .............. 340/472 |
| 4,142,179 | A | * | 2/1979 | Lowndes ...................... 340/321 |
| 4,197,428 | A | * | 4/1980 | Semur et al. ................. 340/2.24 |
| 4,387,362 | A | * | 6/1983 | Gosswiller .................... 340/469 |
| 4,745,530 | A | * | 5/1988 | Farrell et al. ................. 362/549 |
| 5,021,691 | A | * | 6/1991 | Saito ............................... 326/69 |
| D326,237 | S | * | 5/1992 | Gale et al. ................. D10/114.8 |
| 5,567,036 | A | * | 10/1996 | Theobald et al. ............ 362/485 |
| 5,594,433 | A | * | 1/1997 | Terlep ........................ 340/908.1 |
| 5,785,418 | A | * | 7/1998 | Hochstein .................... 362/373 |
| 5,828,244 | A | * | 10/1998 | Palara et al. ................. 327/108 |
| 5,929,755 | A | * | 7/1999 | Hsieh ............................ 340/442 |
| 6,060,918 | A | * | 5/2000 | Tsuchida et al. ............. 327/143 |
| RE36,790 | E | * | 7/2000 | Jincks et al. ................. 340/473 |
| 6,483,439 | B1 | * | 11/2002 | Vukosic .................... 340/815.65 |
| 6,491,417 | B1 | * | 12/2002 | Haen et al. .................... 362/485 |
| 6,552,658 | B1 | * | 4/2003 | Roller et al. ................. 340/475 |
| 6,715,900 | B2 | * | 4/2004 | Zhang .......................... 362/294 |
| RE38,795 | E | * | 9/2005 | Welling et al. .............. 340/691.1 |
| D513,477 | S | * | 1/2006 | Heftman ....................... D10/111 |
| 7,168,827 | B2 | * | 1/2007 | Stein et al. .................... 362/299 |
| D544,805 | S | * | 6/2007 | Corrigan et al. ............. D10/111 |
| D570,722 | S | * | 6/2008 | Taylor ....................... D10/114.8 |
| D584,181 | S | * | 1/2009 | Poon ......................... D10/114.6 |
| 7,534,009 | B2 | * | 5/2009 | Trojanowski et al. ........ 362/234 |
| D598,315 | S | * | 8/2009 | Miyatake .................. D10/109.2 |
| D598,316 | S | * | 8/2009 | Kuwano .................... D10/114.8 |
| D598,799 | S | * | 8/2009 | Shigematsu ............... D10/114.8 |
| D601,053 | S | * | 9/2009 | Ferrie et al. ............... D10/114.8 |
| 7,616,126 | B2 | * | 11/2009 | Kadwell et al. ............... 340/630 |
| D612,760 | S | * | 3/2010 | Chen et al. ................ D10/114.8 |
| 7,772,988 | B1 | * | 8/2010 | Condon et al. ........... 340/815.45 |
| 8,274,411 | B2 | * | 9/2012 | Trattler .......................... 341/26 |
| D669,806 | S | * | 10/2012 | Stein ......................... D10/114.2 |
| D669,807 | S | * | 10/2012 | Stein ......................... D10/114.2 |
| 8,287,153 | B2 | * | 10/2012 | Leung et al. ............. 362/249.02 |
| 8,398,272 | B2 | * | 3/2013 | Osawa .......................... 362/294 |
| D684,078 | S | * | 6/2013 | Clifford et al. ........... D10/114.2 |
| 2005/0110649 | A1 | * | 5/2005 | Fredericks et al. ...... 340/815.45 |
| 2006/0120083 | A1 | * | 6/2006 | Trojanowski et al. ........ 362/294 |
| 2007/0223230 | A1 | * | 9/2007 | Trojanowski et al. ........ 362/294 |
| 2008/0018485 | A1 | * | 1/2008 | Kadwell et al. .............. 340/630 |
| 2010/0120518 | A1 | * | 5/2010 | Borissov et al. ................ 463/25 |
| 2010/0244748 | A1 | * | 9/2010 | Haab et al. .................... 315/313 |
| 2011/0141728 | A1 | * | 6/2011 | Russello et al. .............. 362/235 |
| 2012/0182730 | A1 | * | 7/2012 | Datz et al. ..................... 362/231 |
| 2012/0230029 | A1 | * | 9/2012 | Vanden Eynden et al. ... 362/235 |

OTHER PUBLICATIONS

4500 Series™ LED Beacon, certified, Ultra Bright Compact Super-LED® Beacon brochure, Sound Off Signal® 2011 New Product Release Rev. 0811, 1 page.

6260 Series, SAE Class III LED Beacon brochure, ECCO®, a Division of ECCO Groupe®, admitted prior art as of the earliest filing date of the present application, 1 page.

6465 Series Industrial Applications, SAE Class III LED Beacons brochure, ECCO®, a Division of ECCO Group® admitted prior art as of the earliest filing date of the present application, 1 page.

7160 Series Reflex™, SAE Class I LED Beacon brochure, ECCO®, a Division of ECCO Group® admitted prior art as of the earliest filing date of the present application, 1 page.

7460 Series Profde™, SAE Class I LED Beacon brochure, ECCO®, a Division of ECCO Group® admitted prior art as of the earliest filing date of the present application, 1 page.

7940 Series pulse®, SAE Class II LED Beacons brochure, ECCO®, a Division of ECCO Group® admitted prior art as of the earliest filing date of the present application, 1 page.

7945 Series pulse® II, SAE Class II LED Beacons brochure, ECCO®, a Division of ECCO Group® admitted prior art as of the earliest filing date of the present application, 1 page.

7965 Series pulse® II, SAE Class I LED Beacons brochure, ECCO®, a Division of ECCO Group® admitted prior art as of the earliest filing date of the present application, 1 page.

CL199 & CL299 LED, Bright LED Beacons provide Horizontal and Vertical Signals brochure—PSC Amber® from Code 3®, admitted prior art as of the earliest filing date of the present application, 1 page.

Fresnel Lens, Wikipedia page last modified on Aug. 10, 2013, 8 pages.

Hella LED Beacons, Rota LED,K-LED FO brochure, Hella KGaA Hueck & Co., admitted prior art as of the earliest filing date of the present application, 2 pages.

L21 & L22 Series, 360° Encapsulated Uniform Intensity Super-LED® Beacons brochure, Certified SAE Class I, Whelen® Engineering Company, Inc. product brochure Form #L2221212, copyright 2012, 2 pages.

L21 Series, 360° Encapsulated Uniform Intensity Super-LED® Beacons brochure, Certified SAE Class I, Whelen® Engineering Company, Inc. product brochure Form #L2100411, copyright 2011, 2 pages.

L22 Series 360° Encapsulated Uniform Intensity Super-LED® Beacons brochure, Whelen® Engineering Company, Inc. product brochure Form #L221110, copyright 2010, 2 pages.

L31 & L32 Series 360° Super Bright Uniform Intensity Super-LED® Beacons brochure, Whelen® Engineering Company, Inc. product brochure Form #LEDB0610, copyright 2010, 2 pages.

L40 Series Super-LED®, SAE Class 1 Beacons brochure, Whelen® Engineering Company, Inc. product brochure Form #L410910, copyright 2010, 1 page.

L50 Series Beacons, certified, Ultra Bright Compact Super-LED® Beacon brochure, Whelen® Engineering Company, Inc. product brochure Form #L500310, copyright 2010, 1 page.

LSS222 LED Beacon, an LED Beacon that truly meets strobe and halogen performance, Brochure #LSS222CAM-PSC Amber® from Code 3®, admitted prior art as of the earliest filing date of the present application, 1 page.

Pulsator® LED brochure, Federal Signal copyright 2013, 2 pages.

* cited by examiner

LIGHT BEACON ASSEMBLY

BACKGROUND

Light beacons are generally used in a flashing or continuous manner and are typically placed on large vehicles or buildings to notify others of the size/presence of such objects. Such beacons typically include xenon flash tubes to generate a high intensity, short duration light output. Cylindrical Fresnel lenses have traditionally been used in connection with to direct light from the xenon flash tube (typically centrally located within the light beacon) outwardly around a 360 degree axis. Generally, these lenses include a large number of light surfaces along the rounded side surface, each aligned at different angles to refract light outwardly through a lens from a generally central expected light source location.

Increasingly, light emitting diode (LED) technology has been implemented to take the place of xenon flash tubes, due to the economical, low power nature of LEDs. However, when LEDs are used, they must still remain in a generally central location within such a light beacon. Furthermore, due to the generally high light output levels required by a beacon (i.e., for high visibility), it is often the case that multiple LEDs would be required for use. The higher the output level required, the more difficult it is to locate the increased number of, or size of LED emitters in the central region of the beacon, such that light is output from a location analogous to the traditional xenon light source and allowing the Fresnel lenses to remain effective.

Such approaches have drawbacks. For example, use of multiple LEDs in a small, enclosed space results in heat generation, which must be accounted for. Furthermore, it can be difficult to locate a sufficient number of LEDs such that light is output along a 360 degree axis surrounding the beacon. In current approaches, these challenges are generally addressed by positioning LEDs on a small, cylindrical, central heatsink assembly. This is usually done by placing the LEDs on a small daughterboard, with the light signal controls being placed on a separate main board within the beacon housing, to handle the required control electronics. With this arrangement, there are often several pieces to assemble using screws and wire harnesses. Use of such screws and wiring harnesses between circuit boards leads to possible error, for example by vibration or stress on the beacon assembly causing disconnection of the circuit boards.

Accordingly, improvements in assembly of such LED-based light beacons are desired.

SUMMARY

In general, the above and other issues are addressed by the following:

In a first aspect, a light beacon assembly includes a housing including a base and a lens cooperating to enclose an interior volume, the lens having a generally cylindrical shape. The assembly also includes a plurality of circuit boards positioned within the interior volume, where each of the plurality of circuit boards having a conductive tab extending from a first side, a conductive tab receiver near a second side, and a light emitting diode mounted thereon. The plurality of circuit boards are each positioned within the interior volume and extend perpendicularly from the base such that the tab of each circuit board is received at the tab receiver of an adjacent circuit board. The plurality of circuit boards is interconnected to form a structure having light emitting diodes oriented outwardly toward the lens.

In a second aspect, a light beacon includes a base, a lens, and first, second, and third circuit boards. The lens cooperates with the base to form a generally cylindrical enclosure having an interior volume. The first circuit board is positioned within the interior volume and extending generally perpendicularly from the base, and includes a driver circuit and a first light emitting diode electrically connected between the driver circuit and a tab. The second circuit board is positioned within the interior volume and has a tab receiver and a tab on opposing sides. The second circuit board also includes a second light emitting diode electrically connected between the tab receiver and the tab. The third circuit board is positioned within the interior volume and has a tab receiver and a tab on opposing sides. The third circuit board also includes a third light emitting diode electrically connected between the tab receiver and the tab. The tab receiver of the second circuit board receives the tab of the first circuit board, and the tab receiver of the third circuit board receives the tab of the second circuit board, such that each of the first, second, and third light emitting diodes are electrically connected in series.

In a third aspect, a method of manufacturing a light assembly includes providing a base and a lens cooperating with the base to form a generally cylindrical enclosure having an interior volume. The method further includes interconnecting at least first, second, and third circuit boards by inserting a tab of each circuit board into a tab receiver of an adjacent circuit board, thereby forming an electrical circuit through each of the plurality of circuit boards that includes at least a light emitting diode mounted on each of the circuit boards. The method also includes installing the first, second, and third circuit boards by inserting the first, second, and third circuit boards in corresponding slots of the base such that the first, second, and third circuit board extends generally perpendicularly from the base. The method includes connecting a power signal to the driver circuit of the first circuit board, and installing the lens over the base, thereby enclosing the interior volume including the first, second, and third circuit boards.

DETAILED DESCRIPTION

Figure 1:
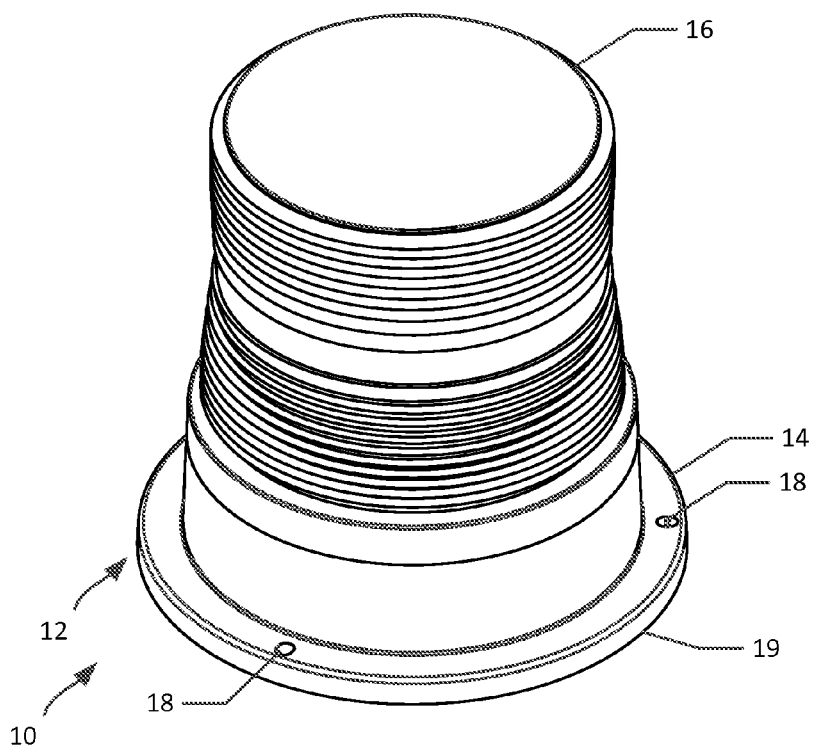
FIG. 1 illustrates a front perspective view of a light beacon, according to an example embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, embodiments of the present invention are directed to a light beacon, light beacon assembly, and methods of constructing a light beacon. The light beacon of the present disclosure is implemented using a plurality of interconnectable circuit boards, with a construction that eliminates the requirement of wires interconnecting the boards, and eliminates the use of screws mounting the circuit boards together. Furthermore, heat dispersion provided by the circuit boards sufficiently addresses the heat generated within the assembly, thereby reducing the requirement of a heatsink in many applications.

In general, and as illustrated in FIGS. 1-4, a light beacon 10 includes a housing 12 formed from a base 14 and a lens 16. The housing 12 has a generally cylindrical shape, when the base 14 and lens 16 are mounted together. The housing 12 is generally configured to be mounted to a vehicle or other installation capable of providing a power signal to the light beacon 10, and which requires use of such a light beacon at a particular location (i.e., as a high-visibility, typically flashing, signal, notifying of the presence of the vehicle or installation to other individuals. The base 14 is generally round in shape, and includes a plurality of mounting locations 18 along a flange 19 extending radially from the base. The mounting locations 18 provide locations at which screws or bolts can be used to mount the light beacon to a desired location.

The lens 16 is configured to disperse light generated within an interior 13 of the light beacon at a plurality of directions to ensure high visibility of the light beacon. In the example embodiment shown, and particularly as described below in connection with FIGS. 9-10, the lens 16 can be implemented as a Fresnel lens.

Figure 2:
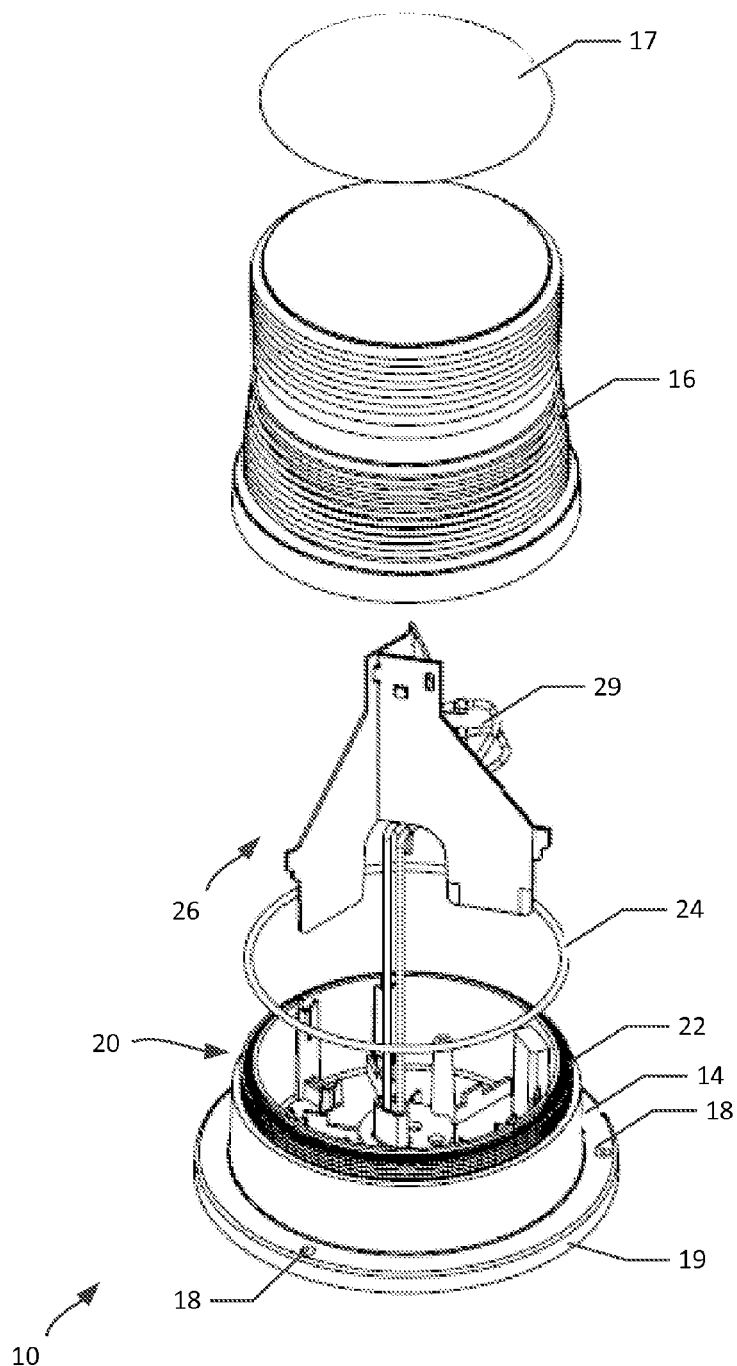
FIG. 2 illustrates an exploded view of the light beacon of FIG. 1.

As further illustrated in connection with FIGS. 2-3, the base 14 and lens 16 cooperate to form the housing 12 by screwing together at a threaded junction 20. In the embodiment shown, the threaded junction 20 is constructed by use of threads 22 on the base 14, as well as complementary threads on an interior of the lens 16. As shown in FIG. 2, a gasket 24, shown as an O-ring, can be located along the threaded junction 20 to assist in forming an environmental seal protecting the interior of the housing 12.

Figure 3:
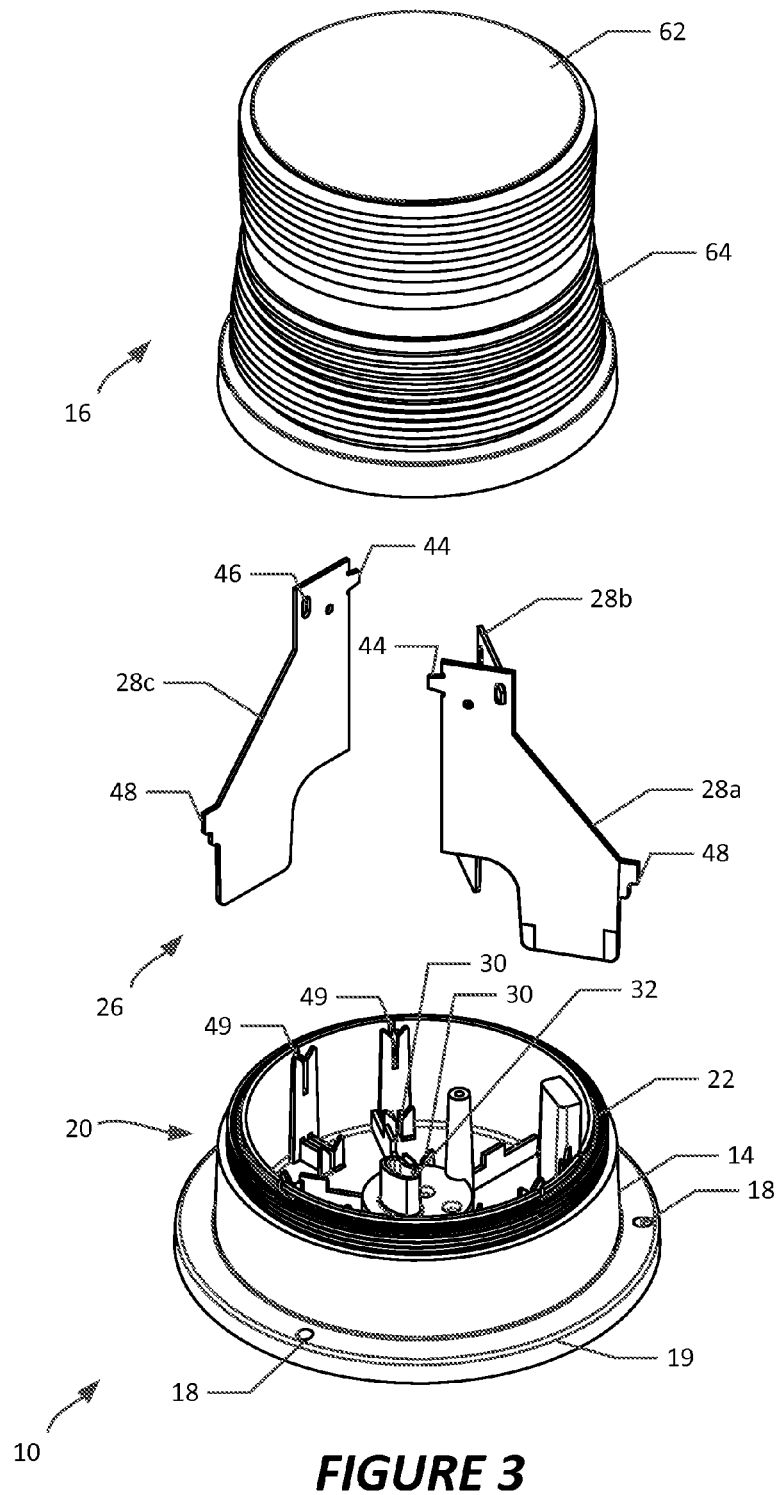
FIG. 3 illustrates an exploded view of portions of the light beacon of FIG. 1.

In the embodiment shown in FIGS. 2-3, a circuit board assembly 26 is located within the interior 13 of the light beacon 10. As further discussed below, the circuit board assembly 26 is constructed from a plurality of circuit boards 28a-c that are cooperatively interconnected, and installable within the interior 13. In the embodiment shown, one or more power signal cables 29 are received within the light beacon 10 through the base 14, and interconnects to one of the circuit boards (shown as board 28a). Although in the embodiment shown three circuit boards are implemented, it is recognized that more or fewer circuit boards could be used in alternative constructions or embodiments contemplated by the present disclosure. Additionally, an optional cap 17 can be used to at least partially opaque the lens 16 on a top surface.

Figure 4:
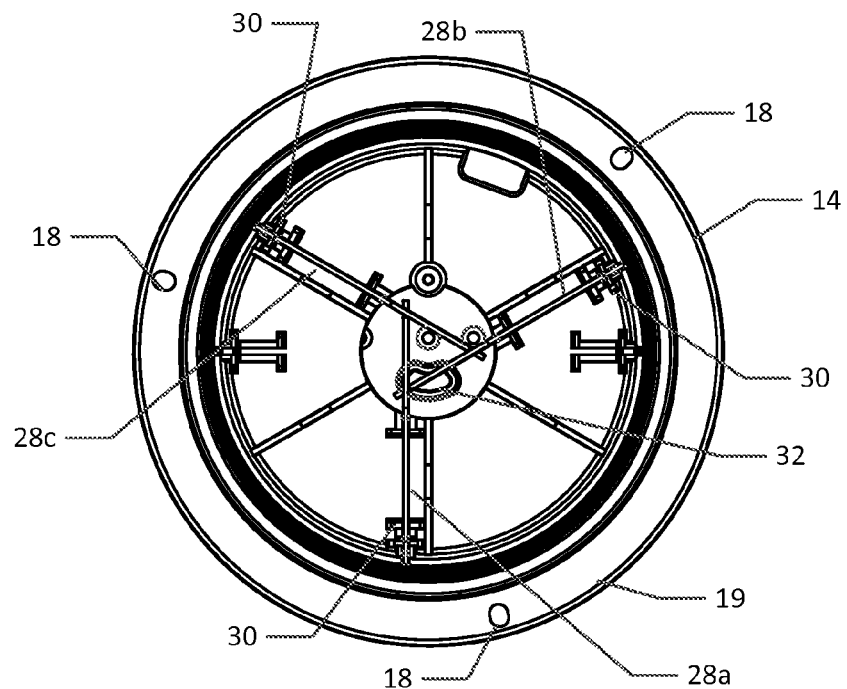
FIG. 4 is a top plan view of the light beacon of FIG. 1 with the lens removed.
Figure 5:
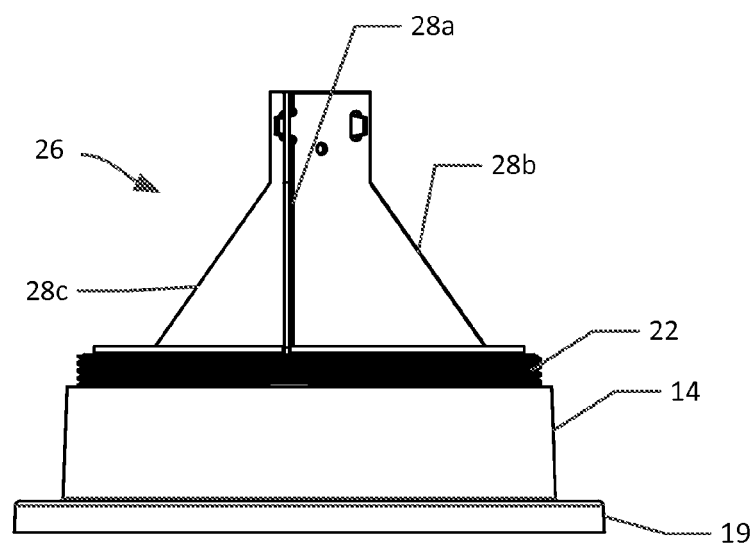
FIG. 5 is a front plan view of the light beacon of FIG. 1 with the lens removed.

Referring specifically to FIGS. 3-5, details regarding the circuit board assembly 26, and its manner of installation within the enclosure 12, are discussed. As shown, each of the circuit boards 28a-c generally extends perpendicularly from the base 12. The base 12 includes projections 30 that form slots sized and positioned to receive and support each of the circuit boards 28a-c. In the embodiment shown, projections are generally positioned both near a perimeter of the base and near a center axis of the base, such that each circuit board is positioned between two sets of projections. Additionally, each of the circuit boards is sized and shaped such that it extends from a generally central location to an outer perimeter of the base, (within the interior portion, i.e., radially inward of the threads 22. However, a variety of other constructions would be possible as well.

Figure 6:
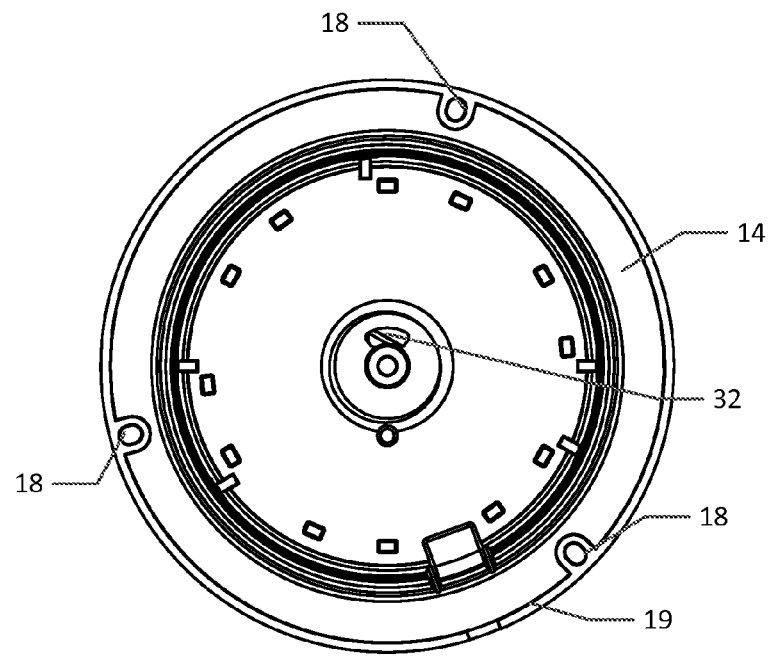
FIG. 6 is a bottom plan view of a base of the light beacon of FIG. 1.

As specifically seen in FIGS. 4 and 6, an opening 32 in the base is sized to receive a signal wire (e.g., power signal cable 29) from external to the housing 12, to provide an electrical signal to the circuit boards 28a-c.

Figure 7:
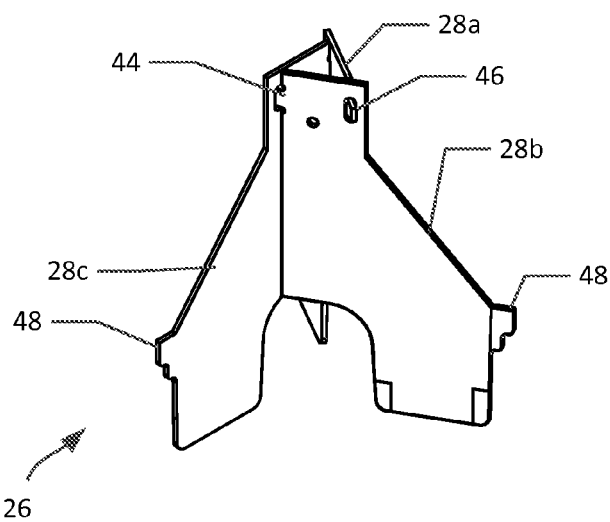
FIG. 7 is a front perspective view of a circuit board assembly useable in the light beacon of FIG. 1.
Figure 8:
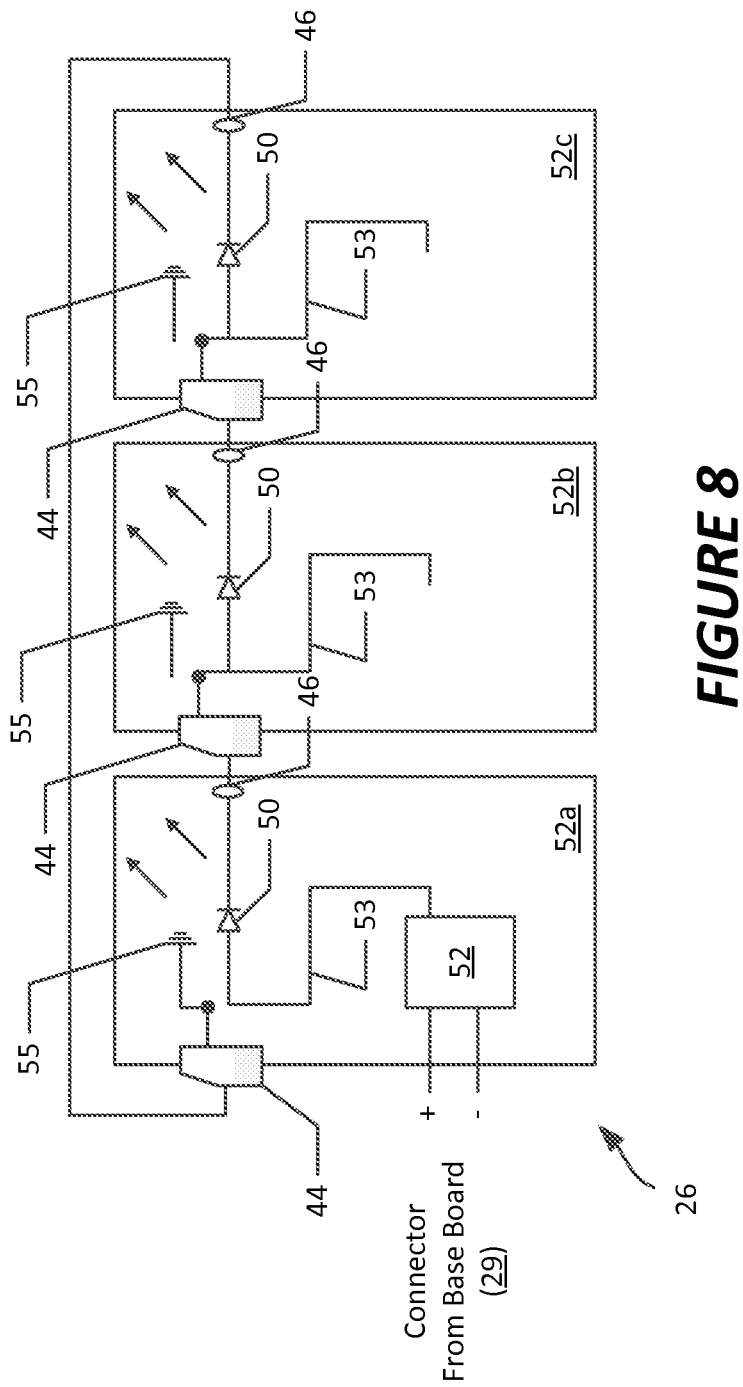
FIG. 8 is a schematic view of a circuit formed using the circuit board assembly of FIG. 7.

Now referring to FIGS. 7-8, additional details regarding the circuit boards 28a-c are described. Generally, FIG. 7 illustrates a possible physical arrangement of circuit boards 28a-c, while FIG. 8 illustrates an example electrical and schematic arrangement of those circuit boards. Overall, each of the circuit boards is constructed from standard materials, such as FR4, and as illustrated, the circuit boards lack heatsinks or other general heat dispersion arrangements other than the natural heat dispersion properties of the circuit boards.

Referring now to FIG. 7, it is seen that each circuit board 28 generally has a top interconnection portion 40 and a base insertion portion 42. The top interconnection portion 40 of each circuit board includes a tab 44 and a tab receiver 46. The tab 44 extends from a first edge of the circuit board, and the tab receiver 46 is located near a second edge of the circuit board, opposite the first edge. Generally, to interconnect the circuit boards, the tab receiver 46 of a first circuit board (e.g., circuit board 28a) receives a tab 44 of an adjacent second circuit board (e.g., circuit board 28b). Concurrently, a tab receiver 46 of the second circuit board (e.g., circuit board 28b) can receive a tab 44 of a third circuit board (e.g., circuit board 28c), and a tab receiver 46 of the third circuit board can receive a tab 44 of the first circuit board. As discussed below in connection with FIG. 8, each of the tab and tab receiver can be conductively connected to a circuit, thereby allowing a circuit to extend across two or more such circuit boards by electrically and physically connecting the circuit boards at the tab and tab receiver.

The base insertion portion 42 is generally sized and positioned to be inserted between the projections 30. As illustrated in FIG. 7, each base insertion portion 42 further includes a mounting tab 48 that is at a radially outermost position of the circuit board assembly 26, and is positioned to engage a slot 49 in a sidewall of the base 14, thereby preventing lateral movement of the circuit board assembly 26 when inserted into the base 14 at the projections 30. Additionally, the base insertion portion 42 is generally offset laterally outward from a central axis of the housing, exposing a generally central opening (e.g., opening 32) for receiving wiring within the interior 13.

Referring to FIG. 8, an example schematic illustrating a possible arrangement of electrical components on the circuit board assembly 26 is shown. In this illustration, the three circuit boards 28a-c of FIG. 7 are depicted schematically, with each circuit board including a light emitting diode 50 mounted thereon. Although in the embodiment shown a single LED 50 is depicted on each circuit board, it is recognized that in alternative embodiments, two or more LEDs could be mounted to each circuit board. In relation to FIG. 7, it is noted that generally the LEDs are mounted on an outwardly facing surface of each circuit board, such that each LED is oriented toward the lens 16.

In addition to the LEDs, it is observed that a first circuit board 28a includes a driver circuit 52 mounted thereon. The driver circuit 52 generally receives a voltage from external to the circuit board 28a on which it is mounted, for example via a signal wire (e.g., power signal cable 29) mounted to the circuit board 28a via a connector. The driver circuit 52 can be configured as a step-up voltage regulator, or can be programmable to cause the LEDs to flash using one or more predetermined flash patterns. Additionally, on that first circuit board 28a, an electrical trace 53 from a location of the driver circuit 52 connects to the LED 50 on that board, thereby driving that LED. Additionally, the LED 50 of the first circuit board 28a is connected to the tab 44 of that board, and the tab receiver 46 is electrically connected to a ground 55.

In general, on the circuit boards that lack the driver circuit 52, the one or more LEDs present on those boards are electrically connected between the tab 44 and tab receiver 46 of the board. As such, these boards can be electrically connected in series to the tab receiver 46 of the first circuit board 28a, thereby forming an electrically contiguous circuit from the driver circuit 52, through LEDs 50 on each of the boards 28a-c, and to a ground connection 55 on the first board.

It is noted that in some embodiments, each of the circuit boards 28a-c can be manufactured including circuit traces 53 and a ground connection 55. This allows each circuit board to be manufactured in a same manner. In other words, generally the same circuit traces can be printed on each of the circuit boards 28a-c, and one of those boards can be configured for use as a primary driver circuit board and the remaining boards can be electrically connected to and receive power from that primary driver circuit board. For example, to form a circuit board assembly, a desired number of circuit boards can be selected, and one of those circuit boards is manufactured to be the driver board. This can include, for example, mounting the driver circuit to the circuit board, and electrically connecting the tab 44 of that board to the ground connection 55. The remaining boards can then have the tab 44 electrically connected to a high-voltage side of the LED 50 of that board, providing electrical continuity from the tab 44, through the LED 50, and to the tab receiver 46. Physical interconnection of the boards then results in formation of the electrical circuit illustrated in FIG. 8, in which a source electrical signal is received at a driver circuit 52 and passed through each of the LEDs 50 to the ground 55 on the same board as the driver circuit.

Referring to FIGS. 7-8 generally, it is noted that the metallic interconnection of the circuit boards 28a-c to form a circuit board assembly 26 results in a drastic reduction in parts and assembly operations required. For example, to interconnect the circuit boards 28a-c, a soldering process can be employed, interconnecting tabs 44 and tab receivers 46. For example in some cases, the tab 44 and tab receiver 46 of each circuit board 28a-c can be metallized, and soldered together or otherwise clipped together to form the circuit board assembly 26. In such cases, the circuit board assembly 26 can be formed without requiring screws or other fasteners. Furthermore, the circuit board assembly 26 can be retained within the interior 13 by securing the lens 16 to the base 14. This results in fewer parts required in the overall assembly of the light beacon, resulting in faster and simpler assembly.

Furthermore, although the circuit board assembly of FIGS. 7-8 is illustrated using three circuit boards, it is recognized that in alternative embodiments additional circuit boards can be incorporated into the circuit board assembly 26, with a tab of each circuit board inserted into a tab receiver 46 of an adjacent circuit board, thereby forming a circuit. In this way, additional light emitting diodes could be incorporated into the circuit.

Figure 9:
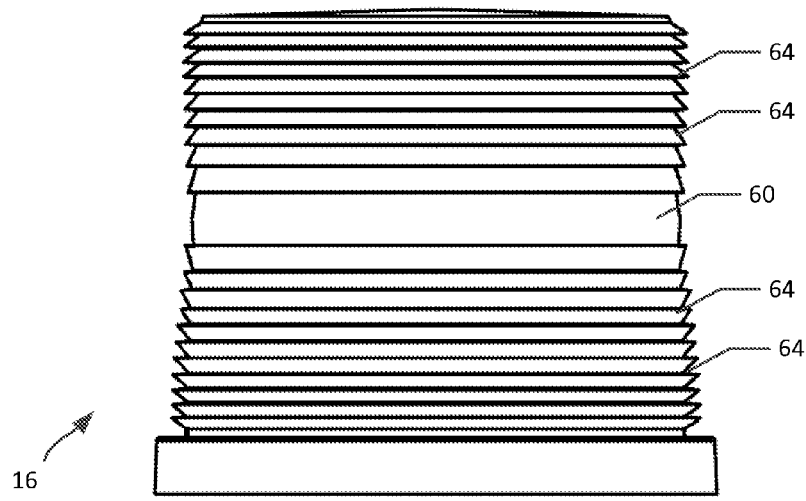
FIG. 9 is a front schematic view of a Fresnel lens useable in the light beacon of FIG. 1.
Figure 10:
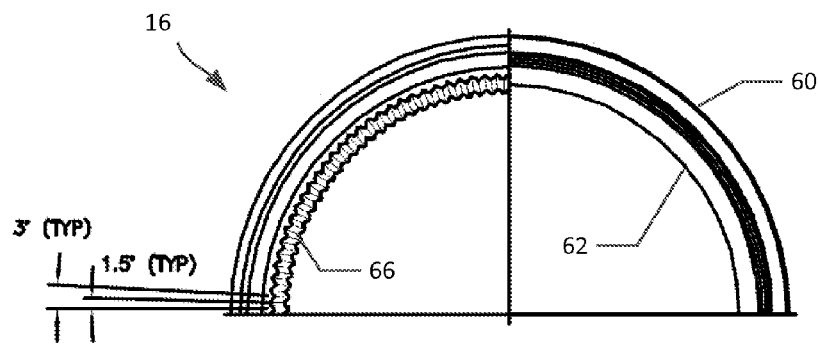
FIG. 10 is a cutaway view of the Fresnel lens of FIG. 9 at different heights along the lens.

Referring now to FIGS. 9-10, details of the lens 16 are illustrated. As shown in FIGS. 9-10, the lens is generally cylindrical in shape, and is translucent, allowing light from the LEDs 50 within the interior 13 to pass through the lens as diffracted by a plurality of lens surfaces. In particular, the lens 16 has an inner surface 60 and an outer surface 62. In the embodiment shown in FIG. 9, the lens 16 is a Fresnel lens, and includes a plurality of ridged lens surfaces 64 generally disposed horizontally around the circumference of the lens 16 and on the outer surface 60 of the lens, configured to diffract light from the LEDs outwardly, at various vertical orientations.

Furthermore, as seen in FIG. 10, the inner surface 62 of the lens 16 has a plurality of different diffraction surfaces as well. As seen generally on the left side of the hemisphere, a bottom portion of the lens 16 (i.e., a portion of the lens constituting at least approximately a quarter of the overall height of the lens starting at its junction with the base, as illustrated in FIG. 1) includes a plurality of vertically-oriented refractive surfaces 66 configured to refract light horizontally at varying angles. In an example embodiment, the surfaces are disposed at approximately every three degrees along the inner circumference of the lens 16 (resulting in a total of 120 lens projections around the lens circumference). Furthermore, along the remainder of the lens, the inner surface 62 can optionally also include such refractive surfaces, either on a surface of the lens or within the lens. Optionally, in some embodiments the refractive surfaces extend vertically along the entire height of the lens.

Referring to FIGS. 1-10 overall, it is noted that although in the embodiments discussed herein the beacon is configured to be generally cylindrical, other shapes would be possible as well. Furthermore, the beacon can be considered generally cylindrical based on the shape of the lens alone, since the base can be of varying sizes or shapes to accommodate mounting of the beacon to a variety of different types and sizes of surfaces.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A light beacon assembly comprising:
a housing including a base and a lens cooperating to enclose an interior volume, the lens having a generally cylindrical shape and including Fresnel surfaces configured to orient light outwardly from a generally central location within the interior volume, wherein the lens is affixed to the base with a weather resistant seal;
a plurality of circuit boards positioned within the interior volume, a first one of the circuit boards including a connector electrically interfaced to a driver circuit and configured to provide a power signal, each of the plurality of circuit boards having a conductive tab extending from a first side, a conductive tab receiver near a second side, and a light emitting diode mounted thereon, wherein each of the plurality of circuit boards includes an insertion portion having a mounting tab extending therefrom, such that the mounting tab extends from the second side in an opposite direction relative to the conductive tab, and wherein the mounting tab engages a slot in a sidewall of the base of the housing,
the light emitting diode of the first one of the circuit boards being connected in series between the connecter and the conductive tab receiver of the first circuit board, the conductive tab of the first one of the circuit boards being connected to ground, the plurality of circuit boards each positioned within the interior volume and extending perpendicularly from the base such that the tab of each circuit board is directly received by and extends into the tab receiver of an adjacent circuit board so as to electrically and physically connect the adjacent circuit boards thereby electrically connecting, in series, the driver circuit, each of the light emitting diodes, and ground, the plurality of circuit boards interconnected to form a structure having light emitting diodes oriented outwardly toward the lens.

2. The light beacon assembly of claim 1, wherein the driver circuit of the first circuit board is electrically connected to the light emitting diode mounted thereon.

3. The light beacon assembly of claim 2, wherein for each circuit board lacking the driver circuit, the light emitting diode is electrically connected between the tab and tab receiver.

4. The light beacon assembly of claim 3, wherein, when each of the plurality of circuit boards are interconnected to form the structure, each of the light emitting diodes on the plurality of circuit boards are connected in series, such that the driver circuit is in electrical connection with each of the light emitting diodes.

5. The light beacon assembly of claim 1, wherein the first circuit board includes a connector electrically interfaced to the driver circuit and configured to provide a power signal, and wherein each of the plurality of circuit boards other than the first circuit board lack a wire connector.

6. The light beacon assembly of claim 1, wherein each of the plurality of circuit boards is mounted within the housing without requiring screws.

7. The light beacon assembly of claim 1, wherein the base has a generally round shape.

8. The light beacon assembly of claim 1, wherein the lens is affixed to the base at a threaded junction.

9. The light beacon assembly of claim 8, further comprising a gasket positioned around a threaded extension on the base forming a portion of the threaded junction, the gasket cooperating with the threaded junction to form the weather resistant seal.

10. A light beacon comprising:
a base;
a lens cooperating with the base to form a generally cylindrical enclosure having an interior volume, the lens including Fresnel surfaces configured to orient light outwardly from a generally central location within the interior volume, wherein the lens is affixed to the base with a weather resistant seal;
a first circuit board positioned within the interior volume and extending generally perpendicularly from the base, the first circuit board including a tab receiver electrically connected to ground, a driver circuit and a first light emitting diode electrically connected between the driver circuit and a tab extending from a side thereof;
a second circuit board positioned within the interior volume and having a tab receiver and a conductive tab on opposing sides, the second circuit board also including a second light emitting diode electrically connected between the tab receiver and the tab; and
a third circuit board positioned within the interior volume and having a tab receiver and a conductive tab on opposing sides, the third circuit board also including a third light emitting diode electrically connected between the tab receiver and the tab;
wherein the tab receiver of the second circuit board directly receives the tab of the first circuit board to electrically and physically connect the first and second circuit boards, and the tab receiver of the third circuit board directly receives the tab of the second circuit board to electrically and physically connect the second and third circuit boards, such that the driver circuit, each of the first, second, and third light emitting diodes, and ground are electrically connected in series; and
wherein each of the first, second and third circuit boards includes an insertion portion having a mounting tab extending therefrom, such that the mounting tab extends from the side having the tab receiver an opposite direction relative to the conductive tab, and wherein the mounting tab engages a slot in a sidewall of the base of the housing.

11. The light beacon of claim 10, wherein the second and third circuit boards each also extend generally perpendicularly from the base.

12. The light beacon of claim 10, wherein the tab of the first circuit board is soldered to the tab receiver of the second circuit board, the tab of the second circuit board is soldered to the tab receiver of the third circuit board, and the tab of the third circuit board is soldered to the tab receiver of the first circuit board.

13. The light beacon of claim 10, wherein the second and third circuit boards extend generally perpendicularly from the base, and wherein the base includes slots sized and positioned to support the first, second, and third circuit boards.

14. The light beacon of claim 10, wherein the base has one or more fastener locations configured to allow the light beacon to be mounted to a vehicle.

15. The light beacon of claim 10, wherein the first, second, and third circuit boards are interconnected within the housing without requiring screws.

16. A method of manufacturing a light assembly, the method comprising:
providing a base and a lens cooperating with the base to form a generally cylindrical enclosure having an interior volume, the lens including Fresnel surfaces configured to orient light outwardly from a generally central location within the interior volume;
affixing the lens to the base with a weather resistant seal;
interconnecting at least first, second, and third circuit boards without wire connectors by inserting a conductive tab of each circuit board into a tab receiver of an adjacent circuit board to electrically and physically connect the adjacent circuit boards, thereby forming an electrical circuit through each of the plurality of circuit boards that includes at least a light emitting diode mounted on each of the circuit boards, wherein each of the first, second and third circuit boards includes an insertion portion having a mounting tab extending therefrom, such that the mounting tab extends from the side having the tab receiver an opposite direction relative to the conductive tab;
installing the first, second, and third circuit boards by inserting the mounting tabs of the first, second, and third circuit boards in corresponding slots of a sidewall of the base such that the first, second, and third circuit board extends generally perpendicularly from the base;
connecting a power signal to the driver circuit of the first circuit board;

installing the lens over the base, thereby enclosing the interior volume including the first, second, and third circuit boards;

whereby the method lacks affixing the circuit boards to the base or each other by use of screws.

17. The method of claim 16, whereby the method lacks interconnecting circuits on the first, second, and third circuit boards using wire connectors.

18. The light beacon assembly of claim 1, wherein insertion portion is generally offset laterally outward from a central axis of the housing to expose a central opening configured for receiving wiring within the interior volume.

* * * * *

UNITED STATES PATENT AND TRADEMARK OFFICE
CERTIFICATE OF CORRECTION

| | | |
|---|---|---|
| PATENT NO. | : 9,228,713 B2 | Page 1 of 1 |
| APPLICATION NO. | : 13/601213 | |
| DATED | : January 5, 2016 | |
| INVENTOR(S) | : Skertich et al. | |

It is certified that error appears in the above-identified patent and that said Letters Patent is hereby corrected as shown below:

ON THE TITLE PAGE

Page 1: City of Assignee: "Oak Brock" should read --Oak Brook--

Signed and Sealed this
Twelfth Day of April, 2016

Michelle K. Lee
*Director of the United States Patent and Trademark Office*